United States Patent
Butler et al.

(10) Patent No.: US 11,566,714 B2
(45) Date of Patent: Jan. 31, 2023

(54) FLUID FLOW CONTROL DEVICES AND RELATED SYSTEMS AND METHODS

(71) Applicant: Flowserve Management Company, Irving, TX (US)

(72) Inventors: Bruce J. Butler, Payson, UT (US); Bradford B. Haines, Springville, UT (US); Paul J. Parish, Springville, UT (US)

(73) Assignee: Flowserve Management Company, Irving, TX (US)

(*) Notice: Subject to any disclaimer, the term of this patent is extended or adjusted under 35 U.S.C. 154(b) by 0 days.

(21) Appl. No.: 17/140,011

(22) Filed: Jan. 1, 2021

(65) Prior Publication Data

US 2021/0215257 A1    Jul. 15, 2021

Related U.S. Application Data

(60) Provisional application No. 62/961,582, filed on Jan. 15, 2020.

(51) Int. Cl.
*F16K 5/04* (2006.01)

(52) U.S. Cl.
CPC .......... *F16K 5/0407* (2013.01); *F16K 5/0414* (2013.01)

(58) Field of Classification Search
CPC .... F16K 5/0414; F16K 5/0407; F16K 5/0214; F16K 5/0207; F16K 47/045; F16K 47/02–16; Y10T 137/86734; Y10T 137/86759; Y10T 137/86791; Y10T 137/86799
USPC ....... 251/126, 127, 188, 283, 286–288, 181, 251/352, 343, 344, 309–312, 301, 251/160–166, 180, 118, 122; 138/42, 43, 138/45, 40, 37; 137/625.24, 315.25, 137/315.26, 15.24, 625.3, 625.33, 625.37, 137/625.38, 625.39
See application file for complete search history.

(56) References Cited

U.S. PATENT DOCUMENTS

| | | | | |
|---|---|---|---|---|
| 16,232 A | * | 12/1856 | Fox et al. ............ | B01D 35/043 210/424 |
| 19,933 A | * | 4/1858 | LaFrance .............. | F16K 47/045 137/625.32 |
| 25,005 A | * | 8/1859 | Fitts ...................... | F16K 47/045 137/625.32 |
| 39,292 A | * | 7/1863 | LaFrance .............. | F16K 47/045 137/625.32 |

(Continued)

FOREIGN PATENT DOCUMENTS

CN  203809704 U  9/2014
EP  1566585 B1  6/2009

(Continued)

OTHER PUBLICATIONS

Kämmer Multi Z Severe Service Valves, Dated 2007, 10 pages.

(Continued)

*Primary Examiner* — Craig J Price
(74) *Attorney, Agent, or Firm* — PCFB LLC

(57) ABSTRACT

Fluid flow control devices and related systems and methods may include a body or housing and a plug at least partially positioned in the body or housing to define a flow path. In a position of the plug, the plug and the body or housing may collectively define a fluid flow path.

20 Claims, 5 Drawing Sheets

(56) References Cited

U.S. PATENT DOCUMENTS

| | | | | |
|---|---|---|---|---|
| 59,565 A * | 11/1866 | Dickinson | ............ | F16K 47/045 137/625.32 |
| 117,853 A * | 8/1871 | Allen | ................... | F16K 5/0414 251/352 |
| 204,162 A * | 5/1878 | Munger | ............... | A01C 23/042 137/584 |
| 264,525 A * | 9/1882 | Drew | ................... | F16K 47/045 251/283 |
| 611,899 A * | 10/1898 | Freeman | ............... | F16K 47/045 137/625.32 |
| 925,587 A * | 6/1909 | Mitchell | ................ | A61C 17/14 4/263 |
| 934,131 A * | 9/1909 | Bell | ...................... | F16K 47/045 251/230 |
| 982,106 A * | 1/1911 | Thornycroft | .......... | B05B 1/3033 239/457 |
| 1,091,048 A * | 3/1914 | Drew | ........................ | F16K 3/26 285/190 |
| 1,132,095 A * | 3/1915 | Glenn | ................. | F16K 37/0016 251/285 |
| 1,214,747 A * | 2/1917 | Betker | ............... | B01D 35/0276 137/556.6 |
| 1,507,806 A * | 9/1924 | Zeller | ................... | B01D 35/005 137/546 |
| 1,707,007 A * | 3/1929 | Harper | ...................... | F16K 5/12 251/297 |
| 2,038,229 A * | 4/1936 | Ross | ......................... | E03D 1/32 251/126 |
| 2,532,177 A * | 11/1950 | Maunula | ............... | B01D 27/00 210/135 |
| 3,078,877 A | 2/1963 | Leeper | | |
| 3,254,872 A * | 6/1966 | Roos | ........................ | F16K 5/184 29/890.128 |
| 3,485,474 A * | 12/1969 | Baumann | ................ | F16K 47/04 251/121 |
| 3,715,098 A * | 2/1973 | Baumann | ................ | F16K 47/04 29/890.128 |
| 3,780,767 A | 12/1973 | Borg et al. | | |
| 3,907,688 A * | 9/1975 | Close | ................... | B01D 35/043 210/444 |
| 3,939,871 A * | 2/1976 | Dickson | .................... | F23K 5/18 137/625.47 |
| 3,971,411 A * | 7/1976 | Baumann | ................ | F16K 47/08 137/625.37 |
| 4,021,190 A * | 5/1977 | Dickson | .................... | F23Q 9/08 431/280 |
| 4,044,992 A * | 8/1977 | Jukoff | ...................... | F16K 47/06 251/126 |
| 4,125,129 A * | 11/1978 | Baumann | ................ | F16K 47/08 137/625.37 |
| 4,156,438 A * | 5/1979 | Kiesow | ................ | F16K 11/083 251/209 |
| 4,177,947 A * | 12/1979 | Menzel | ................... | A01G 25/023 251/126 |
| 4,258,750 A | 3/1981 | Schnall et al. | | |
| 4,473,210 A | 9/1984 | Brighton | | |
| 4,479,509 A * | 10/1984 | Dear | ........................ | F16K 47/02 138/140 |
| RE32,197 E | 7/1986 | Self | | |
| 4,634,434 A * | 1/1987 | Marino, Jr. | ............. | F16K 47/06 251/126 |
| 5,113,908 A | 5/1992 | Steinke | | |
| 5,113,909 A * | 5/1992 | Marin | ................... | F16K 47/045 137/625.3 |
| 5,437,304 A * | 8/1995 | Delcroix | ............... | B29C 35/007 137/625.18 |
| 5,615,708 A * | 4/1997 | Barron | ................... | F16K 47/04 137/625.3 |
| 5,732,738 A | 3/1998 | Graham | | |
| 5,769,122 A | 6/1998 | Baumann | | |
| 5,803,119 A | 9/1998 | Steinke | | |
| 6,095,196 A | 8/2000 | McCarty et al. | | |
| 6,129,338 A * | 10/2000 | Golan | ................... | F16K 11/083 251/312 |
| 6,394,134 B1 | 5/2002 | Kwon | | |
| 6,505,646 B1 * | 1/2003 | Singleton | ................ | F16K 47/08 137/625.33 |
| 6,615,874 B2 | 9/2003 | Thurston et al. | | |
| 6,926,032 B2 | 8/2005 | Nawaz | | |
| 7,096,887 B2 * | 8/2006 | Tupa | ...................... | F23N 1/007 137/625.47 |
| 7,559,339 B2 * | 7/2009 | Golan | ................ | F02M 37/0082 251/287 |
| 7,690,400 B2 * | 4/2010 | Haines | .................... | F16K 47/08 138/40 |
| 7,959,127 B2 * | 6/2011 | Newton | .................. | F16K 47/04 251/118 |
| 8,465,277 B2 * | 6/2013 | Deng | ...................... | F23K 5/005 431/278 |
| 8,602,758 B2 | 12/2013 | Juan et al. | | |
| 9,052,715 B2 | 6/2015 | Kirchner et al. | | |
| 9,175,787 B2 | 11/2015 | Nazir et al. | | |
| 9,556,970 B2 | 1/2017 | Mastrovito | | |
| 9,651,186 B2 | 5/2017 | Ahuja et al. | | |
| 9,683,667 B2 | 6/2017 | Caprera | | |
| 9,851,013 B2 | 12/2017 | Zhou et al. | | |
| 10,006,550 B2 * | 6/2018 | Huang | .................. | F16K 5/0207 |
| 10,036,486 B2 | 7/2018 | Glaun | | |
| 10,094,489 B2 * | 10/2018 | Freitas | .................... | F16K 47/04 |
| 2003/0196713 A1 * | 10/2003 | Ma | ....................... | F16K 11/0836 137/625.47 |
| 2005/0133089 A1 | 6/2005 | Takahashi et al. | | |
| 2006/0191584 A1 * | 8/2006 | Haines | .................... | F16K 47/08 138/42 |
| 2007/0034267 A1 * | 2/2007 | Partridge | .................. | F16K 5/12 137/625.32 |
| 2007/0169942 A1 | 7/2007 | Loretz | | |
| 2007/0240774 A1 | 10/2007 | McCarty | | |
| 2008/0210326 A1 | 9/2008 | Goulet et al. | | |
| 2014/0332103 A1 | 11/2014 | Kwon et al. | | |
| 2017/0067579 A1 | 3/2017 | Glaun | | |
| 2017/0114906 A1 * | 4/2017 | Huang | ..................... | F16K 5/103 |

FOREIGN PATENT DOCUMENTS

| | | | |
|---|---|---|---|
| EP | 3022474 B1 | 11/2018 | |
| FR | 341435 A * | 8/1904 | |
| FR | 2071020 A5 * | 9/1971 | |
| FR | 2582072 A1 | 11/1986 | |
| GB | 1268073 A | 3/1972 | |
| GB | 1339885 A * | 12/1973 | |
| RU | 88090 U1 | 10/2009 | |
| WO | WO 2003/016767 A1 | 2/2003 | |
| WO | 2004024614 A2 | 6/2004 | |
| WO | WO 2006/093956 A1 | 9/2006 | |
| WO | 2012048039 A1 | 4/2012 | |
| WO | WO 2019/152263 A1 | 8/2019 | |
| WO | 2012165677 A1 | 12/2021 | |

OTHER PUBLICATIONS

Worcester Controls CPT Characterized, Dated 2007, 38 pages.
Masoneilan* 77000 Series, Dated 2014, 15 pages.
77000 Series Masoneilan* Axial Flow, Labyrinth Trim Control Valves Instruction Manual, Dated 2015, 32 pages.
PCT International Patent Application No. PCT/US2021012004, International Search Report and Written Opinion dated Apr. 1, 2021, 8 pp.
Neles Rotaryglobe Control Valve, Series ZX, Aug. 2017, 10 pages.

* cited by examiner

FLUID FLOW CONTROL DEVICES AND RELATED SYSTEMS AND METHODS

CROSS-REFERENCE TO RELATED APPLICATIONS

This application claims the benefit of the filing date of U.S. Provisional Patent Application Ser. No. 62/961,582, filed Jan. 15, 2020, for "FLUID FLOW CONTROL DEVICES AND RELATED SYSTEMS AND METHODS," the disclosure of which is incorporated herein in its entirety by reference.

TECHNICAL FIELD

The present disclosure relates generally to fluid flow control devices. For example, embodiments of the present disclosure relate to devices configured to alter at least one characteristic and/or property (e.g., pressure) of fluid passing through the control valve and related systems, assemblies, and methods.

BACKGROUND

In many areas of industry, it is often necessary to reduce the pressure and energy of fluids (both liquids and gases) within a pipeline or valve. One or more control devices may be employed for this purpose. Various designs for control devices have been presented. For example, a device may be employed to divide the flow through the device into a plurality of separate streams configured as a plurality of tortuous fluid flow paths within the device, which fluid paths may be interconnected or separated. As fluid passes through the tortuous fluid flow paths, the fluid changes direction many times. Furthermore, as the fluid travels through the tortuous fluid flow paths, the overall cross-sectional area of the fluid flow path may increase to provide a decrease in the velocity of the fluid within the flow path. The fluid pressure and energy of the fluid is partially dissipated along such paths as a result of losses caused by friction between walls of the path, rapid changes in fluid direction and expansion or contraction chambers. These devices may include what are commonly referred to as tortuous path trim devices.

A fluid flow control device is often provided within a body of a valve, such as a control valve, having a body that is conventionally configured to direct the fluid from an inlet towards the hollow, cylindrical fluid flow control device. The valve may also be configured to direct fluid passing through the fluid flow control device to the exterior thereof towards a fluid outlet. The valve may include a piston, ball, disk, or other device configured to be inserted into a central region of the valve to interrupt fluid flow through the valve and to close the valve.

Pressurized fluids contain stored mechanical potential energy. A fluid flow control device dissipates this energy by reducing the pressure and velocity of the fluid. As the fluid flows through the fluid pathways, the fluid flow may be turbulent. Turbulent fluid has associated pressure and velocity fluctuations that act upon the structural elements of the pipes and fluid control devices in which the fluid is flowing. Pressure and velocity fluctuations may be accompanied by other problems such as erosion, noise, vibration, and cavitation, which is generally caused by fluid pressure drop. In many applications, these accompanying problems are undesirable or unacceptable characteristics of a fluid flow control device. Conventional fluid flow control devices have not adequately limited problems associated with pressure and velocity fluctuations associated with fluids.

BRIEF SUMMARY

Various embodiments of the present disclosure comprise fluid flow control devices, systems, and methods that overcome many of the problems of conventional fluid flow control devices and offer operation benefits. The present disclosure describes embodiments of flow control devices that include fluid paths configured to better control cavitation, vibration, and other problems associated with fluid flow control.

In some embodiments, a fluid flow control device may including a body defining at least one fluid inlet, at least one fluid outlet, and a portion of a fluid flow channel connecting the at least one fluid inlet and the at least one fluid outlet; and a plug positioned at least partially within the body and defining at least one aperture through the plug, the at least one aperture of the plug defining another portion of the fluid flow channel. Where, in a first position of the plug, the at least one aperture is configured to be aligned with the fluid flow channel to define an at least partially tortuous path between the at least one fluid inlet and the at least one fluid outlet; and in a second position of the plug, the at least one aperture is configured to at least partially block the fluid flow channel to at least partially inhibit fluid flow along the fluid flow channel.

In some embodiments, a fluid flow control system includes a fluid inlet; a fluid outlet; and a valve having a fluid flow control device positioned between the fluid inlet and the fluid outlet. The fluid control device defines a fluid pathway between the fluid inlet and the fluid outlet. The fluid flow control device includes a housing having at least one connecting passageway defined in the housing; and a plug positioned at least partially within the housing. Where, in a first position of the plug, one or more openings in the plug and at least one connecting passageway in the housing are configured to define the fluid pathway between the fluid inlet and the fluid outlet; and, in a second position of the plug, the plug is configured to at least partially inhibit fluid flow along the fluid pathway between the fluid inlet and the fluid outlet.

Additional embodiments include a method of reducing a pressure in a fluid with a fluid flow control device. The method includes positioning a plug in a housing in a first closed position to at least partially inhibit fluid flow through the fluid flow control device; and positioning the plug in the housing in a second open position to enable the fluid flow through the fluid flow control device. The positioning the plug in the housing in the second open position including directing the fluid flow through an inlet in the fluid flow control device; directing the fluid flow through an aperture in the plug; altering direction of the fluid flow; and directing the fluid flow through an outlet in the fluid flow control device.

DETAILED DESCRIPTION

Figure 1:
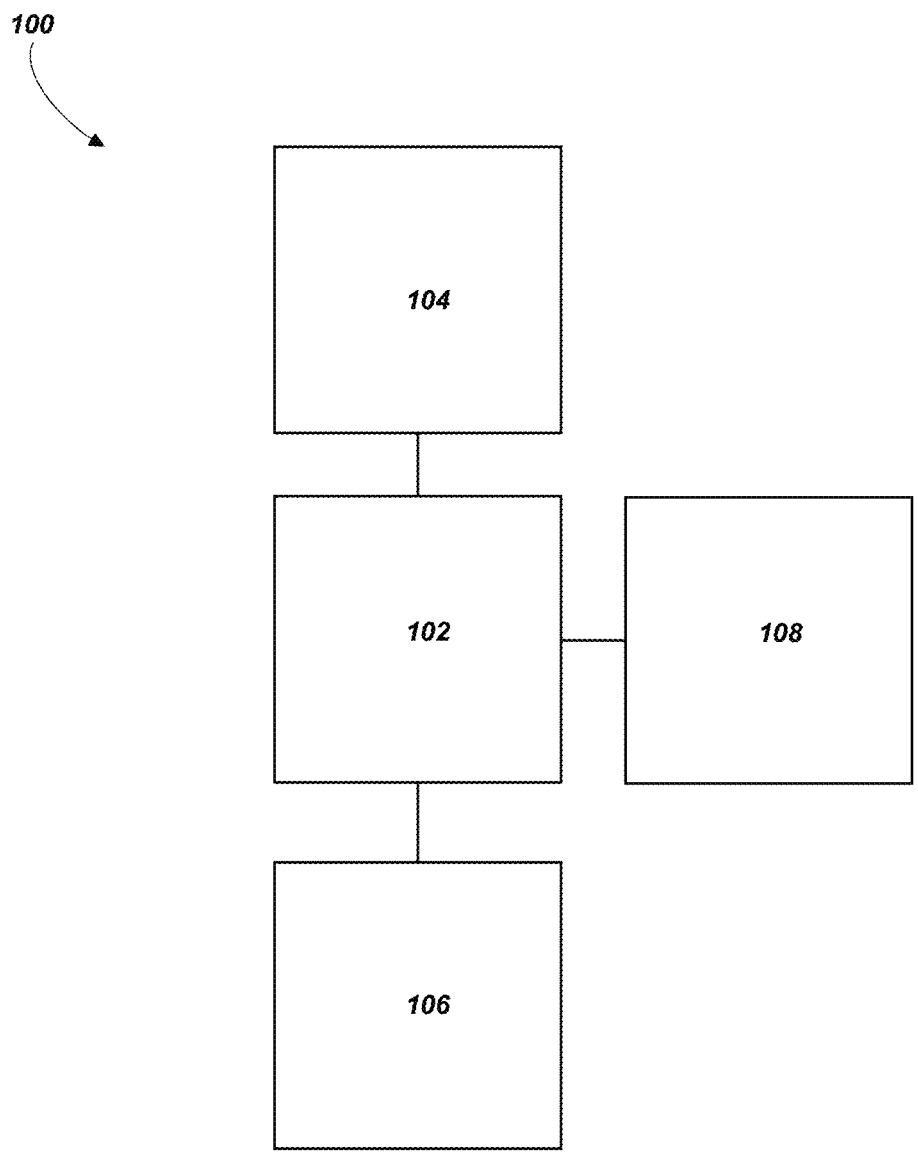
FIG. 1 is a schematic of a system including a fluid flow control device according to embodiments of the disclosure.

The illustrations presented herein are, in some instances, not actual views of any particular fluid flow control device or related system or component, but are merely idealized representations which are employed to describe the present disclosure. In the following detailed description, reference is made to the accompanying drawings, which form a part hereof, and in which is shown, by way of illustration, specific embodiments in which the disclosure may be practiced. These embodiments are described in sufficient detail to enable a person of ordinary skill in the art to practice the disclosure. However, other embodiments may be utilized, and structural, logical, and electrical changes may be made without departing from the scope of the disclosure.

The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material (e.g., particulates). In some embodiments, fluids may convert between a liquid form and a gaseous form during a cooling or heating process as described herein. In some embodiments, the term fluid includes gases, liquids, and/or pumpable mixtures of liquids and solids.

Various embodiments of the present disclosure comprise fluid flow control devices, systems, and methods that may alter at least one characteristic of a fluid flowing through the device (e.g., pressure, flow rate or other flow characteristic, temperature, physical state, etc.). For example, the device may provide a pressure drop (e.g., a multi-stage pressure drop), optionally with one or more expanding passageways.

FIG. 1 is a schematic of a system 100 including a fluid flow control device 102. As shown in FIG. 1, the system 100 may includes one or more components for providing fluid to and/or receiving fluid from the control device 102. For example, the system 100 may include an upstream fluid inlet component 104 (e.g., a component for providing high pressure fluid, for example, from a refining, power, or oil production process) and/or a downstream fluid outlet component 106 (e.g., a component for receiving a low pressure fluid, for example, a fluid drain). In some embodiments, the upstream fluid inlet component 104 and the downstream fluid outlet component 106 may be inlets and outlets of the valve of the system 100 where the fluid flow control device 102 comprises the valve or is placed in the valve as a separate component of the overall valve.

Flow through the fluid flow control device 102 may be regulated by an actuator 108 (e.g., a manual actuator, an electronic actuator, a hydraulic actuator, etc.), optionally coupled to a control system. The fluid flow control device 102 may alter at least one characteristic and/or property (e.g., pressure, flow rate/velocity or other flow characteristic, temperature, physical state, etc.) of a fluid flowing through the control device 102 from the fluid inlet component 104 to the fluid outlet component 106. For example, the control device 102 may act to reduce a pressure in the fluid traveling from the fluid inlet component 104 to the fluid outlet component 106.

Figure 2:
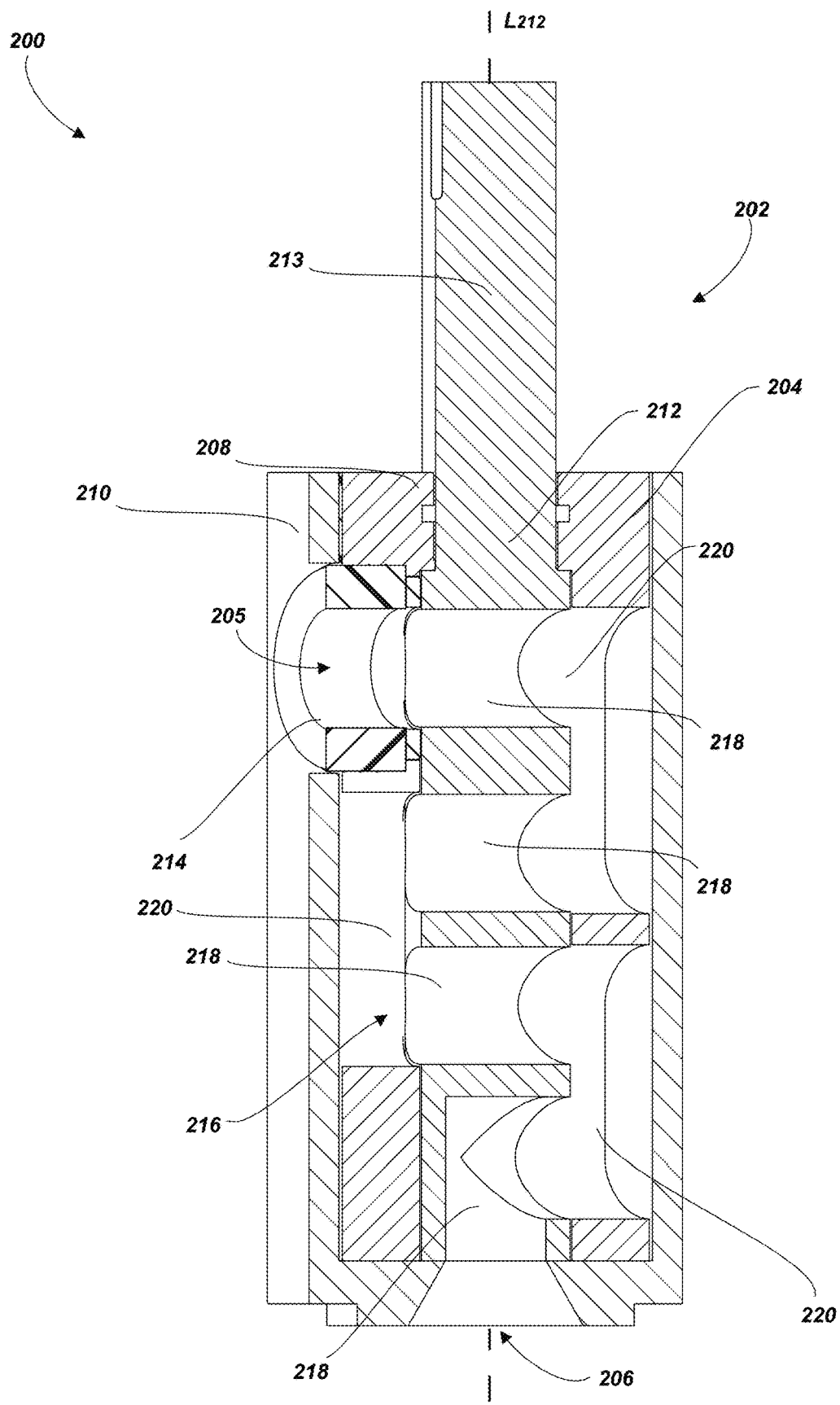
FIG. 2 is a partial cross-sectional view of a fluid flow control device according to embodiments of the disclosure.

FIG. 2 is a partial cross-sectional view of a fluid flow control device 200 that may be similar to, and/or include any the various components of, any of the other fluid control devices discussed herein and utilized in a fluid flow system (e.g., system 100 (FIG. 1)). As shown in FIG. 2, the control device 200 may include a valve 202 having a fluid inlet 205 and a fluid outlet 206. The valve 202 may include a body or a housing 204 (e.g., outer housing) that may include an inner housing 208 at least partially surrounded by an outer sleeve 210 (e.g., which may be shrink fit over the inner housing 208). A valve element or plug 212 may be disposed in the housing 204 (e.g., within the inner housing 208) and may be movable (e.g., rotatable, translatable, combinations thereof, etc.) relative to the housing 204. For example, example, the plug 212 may rotate a select amount relative to the housing 204 (e.g., substantially 60 degrees, 90 degrees, 180 degrees, etc.)

The plug 212 may include an upper portion (e.g., stem 213) for coupling with an actuation device (e.g., the actuator 108 (FIG. 1) In some embodiments, one or more seals (e.g., O-rings, gaskets, packings) may be positioned about the plug 212 (e.g., proximate the stem 213 and/or the fluid outlet 206) in order to provide a seal between the plug 212 and the housing 204 to at least partially prevent fluid leakage.

In some embodiments, the fluid inlet 205 and/or outlet 206 may include a seat or seal 214 for sealing against an upstream component, a downstream component, and/or the plug 212 (e.g., fluid inlet component 104 (FIG. 1) and the plug 212). For example, the seat 214 may define the fluid inlet 205 as the seat 214 extends through the outer sleeve 210 and the inner housing 208 to the plug 212. In some embodiments, the seat 214 may comprise an outer portion (e.g., a seat ring) for sealing against an adjacent external component (e.g., fluid inlet component 104) and an inner portion (e.g., seat ring gasket) for sealing against the plug 212.

As depicted, in a first open position of the plug 212, the housing 204 and the plug 212 may define a fluid pathway 216 that is elongated within the housing 204 (e.g., a tortuous pathway, a meandering pathway, a labyrinthine pathway, a zigzagging pathway, etc.). For example, the plug 212 may include one or more apertures 218 (e.g., holes, openings, cavities, slots, etc.) in the plug 212 (e.g., stacked along an axis, for example a longitudinal axis $L_{212}$ of the plug 212). The fluid pathway 216 may cross the longitudinal axis $L_{212}$ of the plug 212 at multiple locations as is travel back and forth.

One or more of the apertures 218 may comprise a through-hole that extends entirely through the plug 212 (e.g., through a width of the plug 212 or in lateral direction transverse or perpendicular to the longitudinal axis $L_{212}$ of the plug 212). For example, the apertures 218 may open on either lateral side of the plug 212 with a central bore connecting the lateral openings. As depicted, one or more of the apertures 218 (e.g., the lowermost aperture 218) may not extend entirely through the plug 212 in the lateral direction, but may change direction in order to extend to an opening intersecting the longitudinal axis $L_{212}$ of the plug 212 (e.g., extend in a downward direction in order to connect with the fluid outlet 206).

Each aperture 218 may connect to one or more adjacent fluid passageways of the housing 204 (e.g., connecting channels or passageways 220 that are staggered along and about the plug 212). For example, a first uppermost aperture 218 of the plug 212 may connect the fluid inlet 205 with a first connecting passageway 220 in the inner housing 208 of the housing 204 (e.g., in the depicted open position).

The first connecting passageway 220 may extend along an axis (e.g., the longitudinal axis $L_{212}$ of the plug 212) in order to connect the first aperture 218 (e.g., the uppermost aperture 218 as depicted in FIG. 2) to one or more adjacent apertures 218 in the plug 212 (e.g., the second uppermost aperture 218 as depicted in FIG. 2).

The second uppermost aperture 218 may connect the first connecting passageway 220 to a second connecting passageway 220 (e.g., positioned in lateral opposition to the first connecting passageway 220 on the opposing side of the plug 212).

In some embodiments, spacing between the first and second apertures 218 may be greater than the remaining apertures 218 (e.g., to facilitate positioning of the seat 214).

A third aperture 218 may connect the second connecting passageway 220 to a third connecting passageway 220 (e.g., positioned in alignment with the first connecting passageway 220 and in lateral opposition to the second connecting passageway 220 on the opposing side of the plug 212).

The third connecting passageway 220 may connect the third aperture 218 to a fourth lowermost aperture 218 (e.g., the lowest aperture 218 that defines a portion of the fluid outlet 206).

Each of the apertures 218 in the plug 212 and the connecting passageways 220 in the housing 204 may define a stage (e.g., a pressure drop stage). While the device 102 of FIG. 1 includes seven stages, other implementations may include more or less stages including variations of the number of the apertures 218 and the number of the connecting passageways 220 as dictated by the application (e.g., three or more stages, six stages, eight to fifteen stages, or more or less, etc.).

As depicted, and as shown in greater detail below in FIGS. 3, 5, and 6, the connecting passageways 220 may each extend entirely through the inner housing 208 to define a lateral opening at an outermost surface of the inner housing 208. The outer sleeve 210 may act to enclose the outermost portions of the connecting passageways 220 and may optionally be sealed to the inner housing 208 (e.g., via shrink fit and/or other O-rings, gaskets, seals, packings, etc.) in order to at least partially prevent fluid leakage.

As depicted, a portion of the housing 204 (e.g., the outer sleeve 210) may contain the plug 212 within the overall housing 204 (e.g., to restrict movement of the plug 212 in one or more directions along the longitudinal axis $L_{212}$ of the plug 212).

In some embodiments, a portion of the housing 204 (e.g., the outer sleeve 210) may define the fluid outlet 206. As depicted, the fluid outlet 206 may increase in size (e.g., cross-sectional area) as it extends from the lowermost portion of the plug 212.

In some embodiments, the apertures 218 in the plug 212 and the connecting passageways 220 in the housing 204 may each comprise substantially annular shapes (e.g., circular, oval, ellipse, ovoid, etc.) in order to define the fluid pathway 216 that has a substantially rounded shape (e.g., generally annular cross section). In additional embodiments, the apertures 218 and/or the connecting passageway 220 may comprise other cross-sectional shapes (e.g., square, rectangular, polygonal, etc.).

Figure 3:
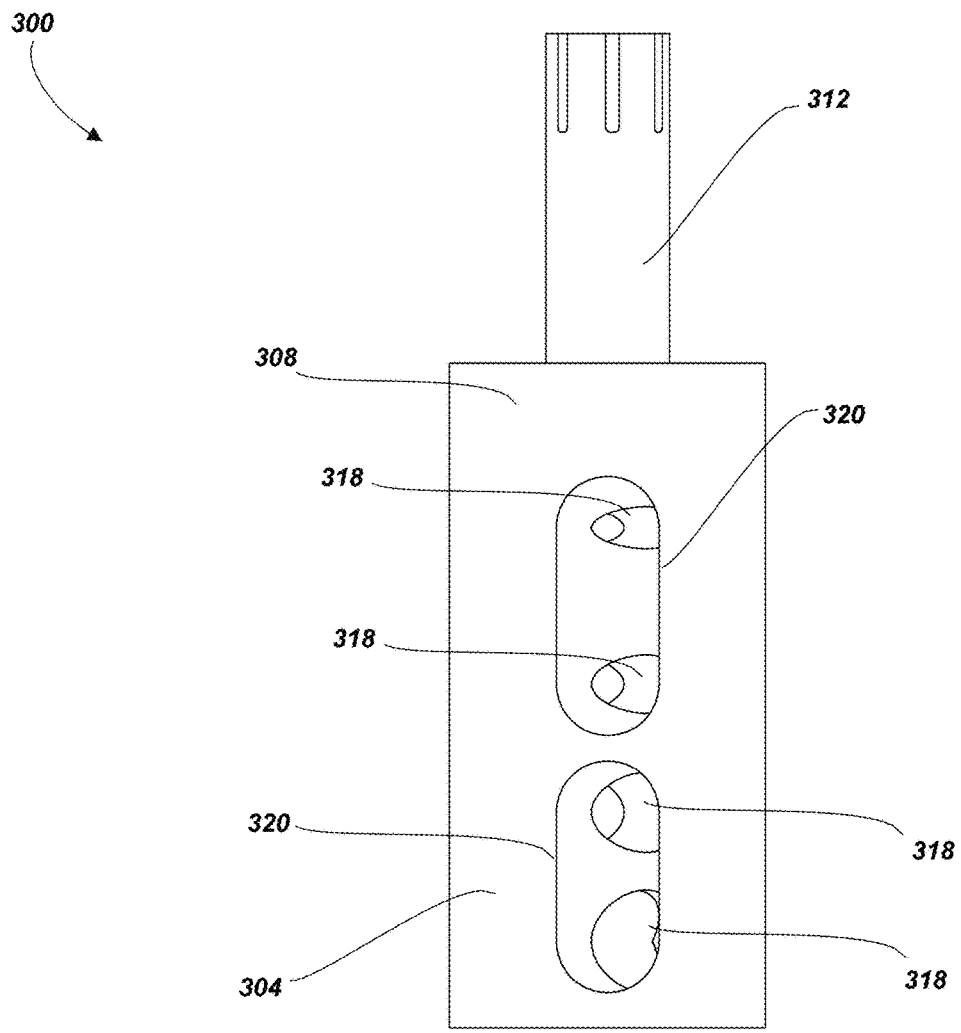
FIG. 3 is a side view of a fluid flow control device according to embodiments of the disclosure.
Figure 4:
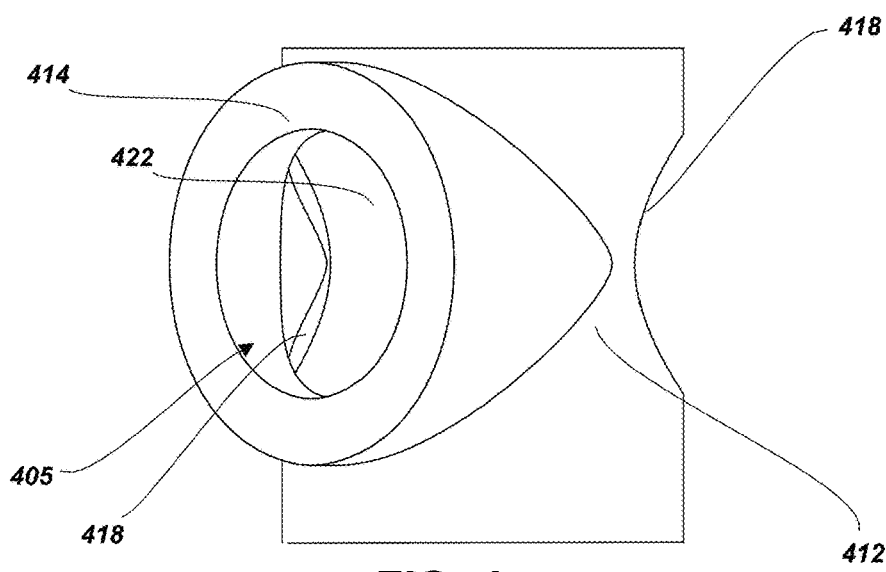
FIG. 4 is a portion of a fluid flow control device according to embodiments of the disclosure.

FIG. 3 is a side view of a fluid flow control device 300, which may be similar to, and/or include any the various components of, any of the other fluid control devices discussed herein, with an associated outer sleeve (e.g., outer sleeve 210 (FIG. 2)) removed for clarity. As shown in FIG. 4, the fluid flow control device 300 is positioned in an at least partially closed and/or an at least partially open position where apertures 318 in a plug 312 are only partially in communication with (e.g., exposed to) passageways 320 while a remaining area of the apertures 318 is blocked by the housing 304 (e.g., by the inner surface of the inner housing 308).

As discussed below, such a configuration may provide pressure drops of varying magnitude between stages (e.g., between each aperture 318 and adjacent passageways 320). For example, fluid traveling into the plug 312 is restricted by a lateral opening of the aperture 318 that is only partial exposed. Once within the aperture 318, the fluid may expand to fill the central portion of the aperture 318. The rate or amount of flow of the fluid is again restricted by another lateral opening of the aperture 318 and, then again, may expand into the adjacent downstream connecting passageway 320. Thus, depending on the properties of the fluid, the fluid may experience a pressure drop at the transition into the apertures 318 and/or the transition into the connecting passageway 320.

As depicted, all or some of the apertures 318 may comprise substantially annular shapes (e.g., circular, oval, etc.) and may differ from adjacent apertures 318. Further, while the embodiment of FIG. 2 includes apertures 218 of substantially circular cross section, some or all of the apertures 318 may have differing cross sections (e.g., oval, ellipse, ovoid). Such a configuration may enable a user greater control of flow through the apertures 218 as the oval cross section may provide less flow as compared to a circle cross section.

As mentioned above, the passageways 320 each extend entirely through the inner housing 308 to define a lateral opening at an outermost surface of the inner housing 308. An associated outer sleeve (e.g., similar to outer sleeve 210 discussed above) may enclose the outermost portions of the connecting passageways 320 and may optionally be sealed to the inner housing 308 in order to at least partially prevent fluid leakage.

FIG. 4 is a portion of a fluid flow control device (e.g., plug 412 and seat 414). As shown in FIG. 4, the plug 412 may abut with the seat 414 (e.g., under fluid pressure applied to the seat 414 at the fluid inlet 405) in order to form a seal between the plug 412 and the seat 414. As depicted, the seat 414 may have one side that has a scalloped or similar cutout shape to fit tightly with the plug 412. As the plug 412 is rotated, apertures 418 may come into and out of contact with the seat 414 to enable fluid to flow from the inlet 405 into the apertures 418 of the plug 412 or for flow to be inhibited by a solid outer surface 422 of the plug 412.

Figure 5:
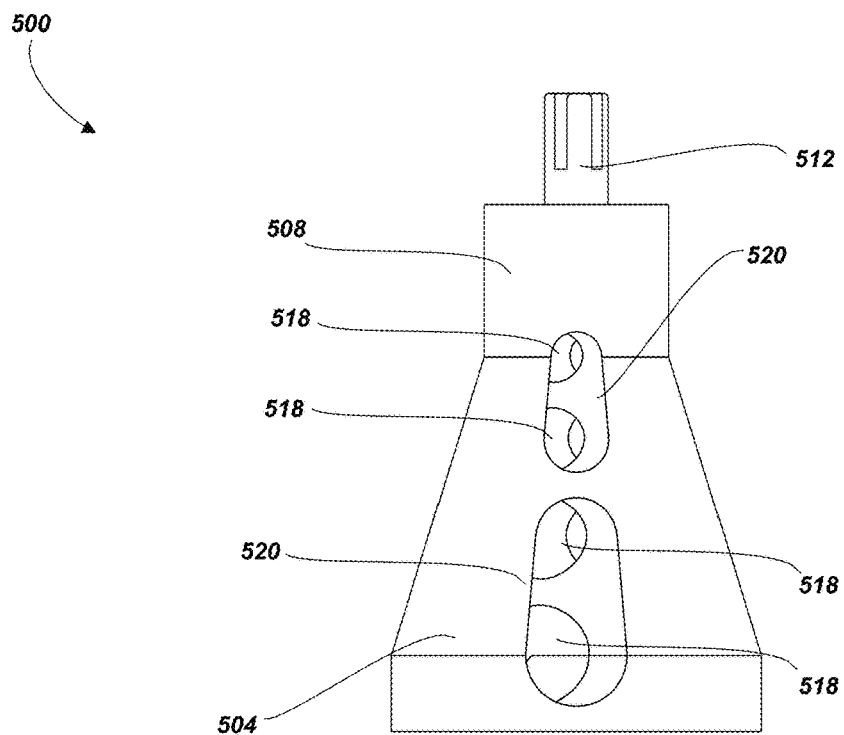
FIG. 5 is a side view of a fluid flow control device according to embodiments of the disclosure.

FIG. 5 is a side view of a fluid flow control device 500, which may be similar to, and/or include any the various components of, any of the other fluid control devices discussed herein, with an associated outer sleeve (e.g., an at least partially tapered outer sleeve that complementary to inner housing 508 of housing 504) removed for clarity. FIG. 6 is a partial cross-sectional view of the fluid flow control device 500.

Figure 6:
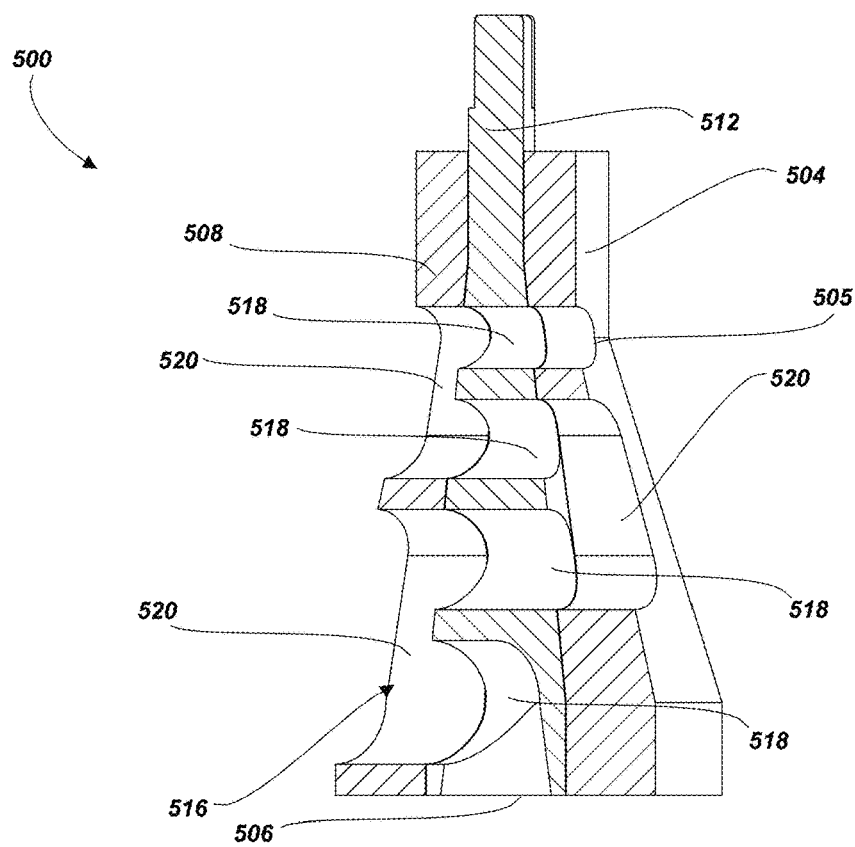
FIG. 6 is a partial cross-sectional view of a fluid flow control device according to embodiments of the disclosure.

As shown in FIGS. 5 and 6, the fluid flow control device 500 may define a fluid pathway 516 that increases in size (e.g., in cross-sectional area, diameter, a lateral or longitudinal direction, etc.) as the fluid pathway 516 extends or travels between a fluid inlet 505 and a fluid outlet 506 (e.g., from the fluid inlet 505 to the fluid outlet 506). Such a configuration may act to gradually alter one or more properties of fluid (e.g., a pressure drop, a change in fluid flow characteristics, etc.) as the fluid travels along the fluid pathway 516 between a fluid inlet 505 and a fluid outlet 506. In such an embodiment, the fluid inlet 505 may be smaller (e.g., in cross-sectional area) than the fluid outlet 506 (e.g., in cross-sectional area).

As depicted, the base of the fluid flow control device 500 may be larger than an upper portion of the fluid flow control device 500 such that the fluid flow control device 500 exhibits a conical or tapered shape. In some embodiments, one or more of the ends of the fluid flow control device 500 may include a non-tapered (e.g., cylindrical) section. For example, both ends may comprise non-tapered end sections with a tapered section extending between the end sections (e.g., as depicted in FIG. 5).

A plug 512 in the fluid flow control device 500 may have a complementary conical or tapered shape (e.g., with the exclusion of upper portion of the plug 512 that retains a uniform cross section). Apertures 518 in the plug 512 and connecting passageways 520 in the fluid flow control device 500 may each gradually decrease in size (e.g., cross sectional area) in order to define the fluid pathway 516 that decreases in size (e.g., cross sectional area) along its length between the fluid inlet 505 and the fluid outlet 506.

Figure 7:
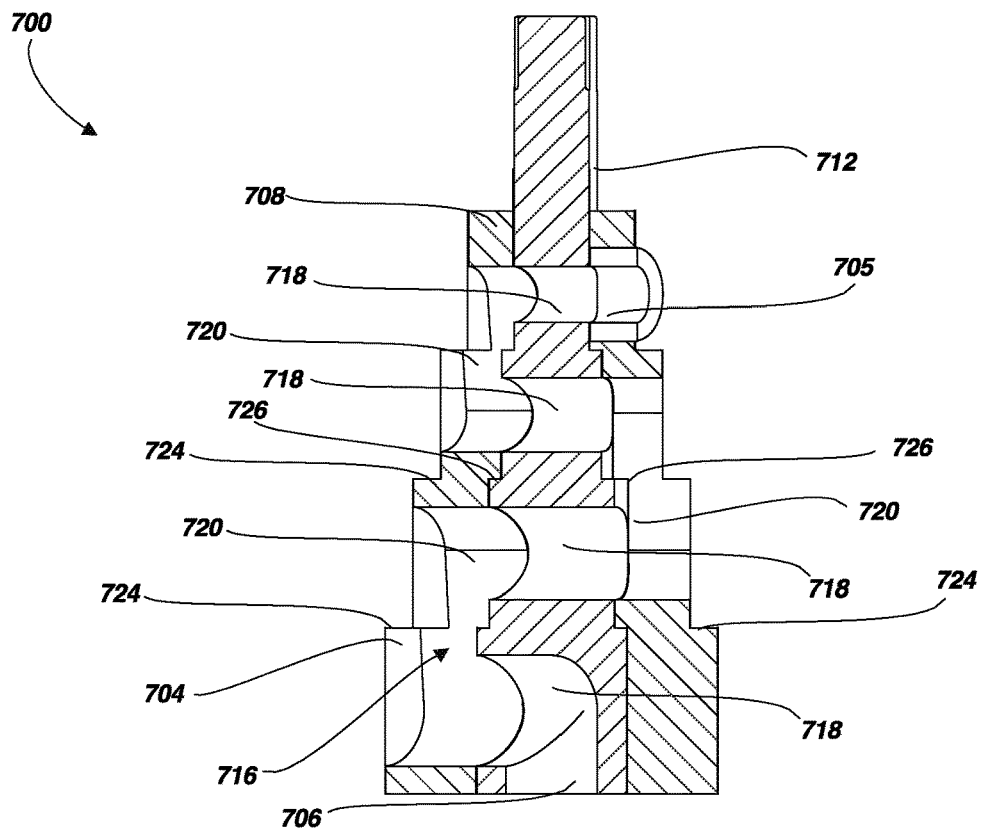
FIG. 7 is a partial cross-sectional view of a fluid flow control device according to embodiments of the disclosure.

FIG. 7 is a partial cross-sectional view of the fluid flow control device 700, which may be similar to, and/or include any the various components of, any of the other fluid control devices discussed herein, with an associated outer sleeve (e.g., an at least partially stepped outer sleeve that complementary to inner housing 708 of housing 704) removed for clarity. As shown in FIG. 7, the fluid flow control device 700 may define a fluid pathway 716 that increases in size (e.g., in cross-sectional area, diameter, a lateral or longitudinal direction, etc.), in a similar manner to the fluid flow control device of FIGS. 5 and 6, as the fluid pathway 716 extends or travels between a fluid inlet 705 and a fluid outlet 706 (e.g., from the fluid inlet 705 to the fluid outlet 706). However, rather than a conical or tapered shape, the fluid flow control device 700 may exhibit a stepped shape where one or more apertures 718 in the plug 712 and connecting passageways 720 in the fluid flow control device 700 include distinct steps 724. For example, the portion of the fluid flow control device 700 defining the connecting passageways 720 may have steps 724. The plug 712 may be tapered or cylindrical as above or, as depicted, may include similar steps 726 (e.g., that interface complementarily with inter portions of the steps 724 of the housing 704).

Such steps 724 and the increasing size of the fluid pathway 716 may act to alter one or more properties of fluid (e.g., a pressure drop, a change in fluid flow characteristics, etc.) as the fluid travels along the fluid pathway 716 between a fluid inlet 705 and a fluid outlet 706 and is exposed to the larger cross-sectional areas of the fluid pathway 716 at each of the steps 724 (e.g., in a substantially gradual manner where larger pressure drops may occur proximate the steps 724).

Figure 8:
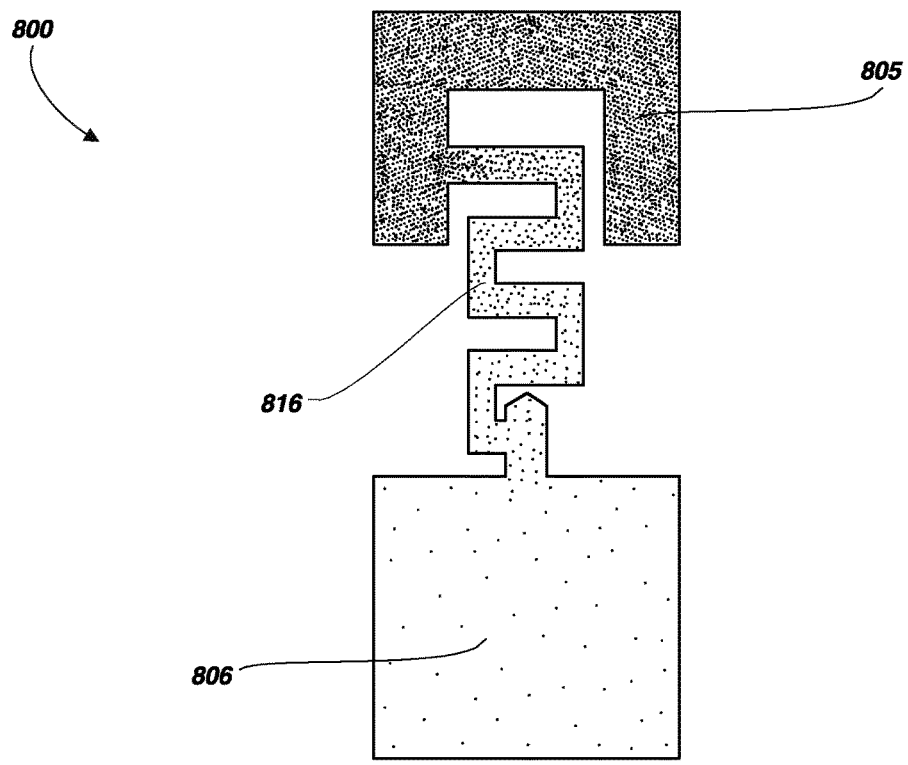
FIG. 8 is a graphical representation of a pressure profile of a fluid flow control device according to embodiments of the disclosure.

FIG. 8 is a graphical representation of a pressure profile of a fluid flow control device 800. As shown in FIG. 8, the pressure in a fluid pathway 816 extending between a fluid inlet volume or component 805 to a fluid outlet volume or component 806 may gradually decrease from the darker color indicating relatively higher fluid pressure to the lighter color indicating a relatively lower fluid pressure.

In operation, embodiments of a fluid flow control device or system (e.g., such as those discussed above) may be utilized to alter a characteristic and/or property of a fluid traveling through the fluid flow control device or system. For example, pressure in a fluid may be reduced with the fluid flow control device by positioning the plug in the housing in a first closed position to at least partially inhibit fluid flow through the fluid flow control device. The plug may then be partially or entirely moved to a second open position to enable fluid flow from an inlet through the fluid flow control device and through an aperture in the plug (e.g., an aperture extending entirely through the plug from a first lateral side to a second opposing lateral side of the plug).

As discussed above, when in a partially open position, pressure drops may exist between each stage in the device. In a fully open position, a pressure drop and/or velocity reduction may be provided (e.g., via relatively larger volumes provided in the connecting passageways of the fluid flow control device, via a gradually expending cross section in the portions of the fluid flow control device define the fluid passageway, combinations thereof, etc.).

In addition to traveling through the plug, direction of the fluid flow may by altered (e.g., on either side of the plug by connecting passageway in the housing). After redirecting the fluid flow one or more times (e.g., along a tortuous fluid pathway), the fluid flow may be directed through an outlet in the fluid flow control device.

In some embodiments, the various components discussed above may be formed by any suitable material, such as, metal materials, for example, steel, chrome, iron, metal particle matrix composites, alloys (e.g., nickel alloys, such as, INCONEL®, stainless steel), ceramics, composite materials, combinations thereof, etc.

Embodiments of the disclosure may be particularly useful in providing modification of one or more properties and/or characteristics of fluid as it passes through the fluid flow control device, which may be a valve, or a component positioned in a valve. Such modification may include a multi-stage pressure drop where cavitation potential, and associated noise, is significantly reduced by the gradual and/or stepped fluid flow process. By adding more stages to the fluid flow control device, the risk of cavitation may be be further reduced. Further, the tortuous fluid path may be used to reduce turbulence, shear, and fluid velocity in the fluid.

In some embodiments, the tortuous fluid path (e.g., defined by the apertures and connecting passageways) may have an internal dimension (e.g., cross-sectional area) capable of reliably handling entrained solids or particulates in single or multi-phase process fluids and slurries. Some embodiments may enable tight operational control of a high-pressure fluid traveling through the fluid flow control device in order to at least partially prevent and/or substantially reduce the chance that unintended fluid (e.g., gas) is released when altering the pressure of the fluid (e.g., to ensure compliance with emission controls).

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims which follow.

What is claimed is:

1. A fluid flow control device, comprising:
   a body defining at least one fluid inlet, at least one fluid outlet, and a portion of a fluid flow channel connecting the at least one fluid inlet and the at least one fluid outlet; and
   a plug positioned at least partially within the body and defining two or more apertures through the plug, the two or more apertures of the plug defining another portion of the fluid flow channel, wherein:
   the body defines connecting passageways that connect the two or more apertures of the plug with an adjacent aperture of the two or more apertures and with one or more of the at least one fluid inlet or the at least one fluid outlet;
   the connecting passageways defined by the body gradually increases in internal size as the fluid flow channel extends from the at least one fluid inlet and to the at least one fluid outlet;
   in a first position of the plug, the two or more apertures are configured to be aligned with the fluid flow channel to define an at least partially tortuous path between the at least one fluid inlet and the at least one fluid outlet; and
   in a second position of the plug, the two or more apertures are configured to at least partially block the fluid flow channel to at least partially inhibit fluid flow along the fluid flow channel.

2. The fluid flow control device of claim 1, wherein the at least one fluid inlet and the at least one fluid outlet are axially spaced along a rotational axis of the plug.

3. The fluid flow control device of claim 1, wherein the at least one fluid inlet comprises an entrance to the fluid flow control device having a first internal cross section and the at least one fluid outlet comprises an exit of the fluid flow control device having a second internal cross section that is larger than the first internal cross section of the at least one fluid inlet.

4. The fluid flow control device of claim 1, wherein the plug is configured to rotate relative to the body between the first position and the second position.

5. The fluid flow control device of claim 1, wherein each of the two or more apertures are spaced along an axis of rotation of the plug.

6. The fluid flow control device of claim 5, wherein the body defines at least two connecting passageways, and wherein each connecting passageway directly connects one aperture of the two or more apertures with one of another, adjacent aperture of the two or more apertures, the at least one fluid inlet, or the at least one fluid outlet.

7. The fluid flow control device of claim 6, wherein the at least two connecting passageways are staggered along the axis of rotation of the plug on opposing sides of the body.

8. The fluid flow control device of claim 1, wherein one of the connecting passageways extends between and fluidly connects two of the two or more apertures.

9. The fluid flow control device of claim 8, wherein the at least one connecting passageway gradually increases in internal size as the at least one connecting passageway extending from an upstream inlet positioned relatively closer to the at least one fluid inlet to a downstream outlet positioned relatively closer to the at least one fluid outlet.

10. The fluid flow control device of claim 1, wherein the at least one fluid outlet extends through the plug at a lowermost portion of the body.

11. The fluid flow control device of claim 1, wherein the body defines an at least partially tapered shape, wherein the fluid flow channel of the fluid flow control device increases in internal size as it travels from a relatively smaller upper portion of the body to a relatively larger lower portion of the body.

12. The fluid flow control device of claim 1, wherein the fluid flow channel comprises the at least partially tortuous path having portions that cross a single axis more than one time.

13. The fluid flow control device of claim 1, wherein the fluid flow channel is configured to reduce a pressure of fluid traveling through the fluid flow channel between the at least one fluid inlet and the at least one fluid outlet.

14. A method of reducing a pressure in a fluid with the fluid flow control device of claim 1, the method comprising:
   in the fluid flow control device, position the plug in the in the body in the second position to at least partially inhibit fluid flow through the fluid flow control device; and
   moving the plug in the body to the first position about a longitudinal axis of the plug to enable the fluid flow through the fluid flow control device, comprising:
      directing the fluid flow through the at least one fluid inlet in the fluid flow control device;
      directing the fluid flow through an aperture of the two of more apertures in the plug;
      altering direction of the fluid flow; and
      directing the fluid flow through the at least one fluid outlet in the fluid flow control device.

15. The method of claim 14, wherein positioning the plug in the body in the first position further comprises:
   after altering direction of the fluid flow in a first direction with a connecting passageway defined in the body, directing the fluid flow through another aperture in the plug; and
   after directing the fluid flow through the another aperture in the plug, altering direction of the fluid flow in a second direction that is substantially similar to the first direction.

16. The method of claim 14, wherein positioning the plug in the body in the first position further comprises gradually increasing a cross-sectional area of a substantial entirety of a fluid flow path as the fluid flow travels from the at least one fluid inlet to the at least one fluid outlet.

17. The method of claim 14, wherein directing the fluid flow through the aperture in the plug comprises flowing the fluid flow through a through hole extending entirely through a lateral width of the plug.

18. A fluid flow control system, comprising:
 a fluid inlet;
 a fluid outlet; and
 a valve having a fluid flow control device positioned between the fluid inlet and the fluid outlet, the fluid flow control device defining a fluid pathway between the fluid inlet and the fluid outlet, the fluid flow control device comprising:
  a housing having at least one connecting passageway defined in the housing; and
  a plug positioned at least partially within the housing, the plug comprising two or more openings extending through an entirety of the plug in a lateral direction, the two or more openings each being separately positioned and spaced along an axis of rotation of the plug, wherein the plug is configured to rotate about the axis of rotation between a first position and a second position, wherein:
   in the first position of the plug, the two or more openings in the plug and the at least one connecting passageway in the housing are configured to define the fluid pathway having three or more stages between the fluid inlet and the fluid outlet; and
   in the second position of the plug, the plug is configured to at least partially inhibit fluid flow along the fluid pathway between the fluid inlet and the fluid outlet.

19. The fluid flow control system of claim 18, wherein, in the first position, the two or more openings in the plug and the at least one connecting passageway in the housing define the fluid pathway comprising a zigzag pattern configured to elongate the fluid pathway.

20. The fluid flow control system of claim 19, wherein the zigzag pattern of the fluid pathway gradually increases in cross section as the fluid pathway extends from the fluid inlet to the fluid outlet.

\* \* \* \* \*